United States Patent

Iliff et al.

[15] 3,699,324
[45] Oct. 17, 1972

[54] ENERGY SOURCE TRACKING SYSTEM EMPLOYING DRIFT-LINE TECHNIQUE

[72] Inventors: Walter R. Iliff; John M. Holt; George E. Chadima, all of Cedar Rapids; Robert G. Brown, Ames, all of Iowa; Collins Radio Company, Cedar Rapids, Iowa

[22] Filed: Sept. 17, 1970

[21] Appl. No.: 72,910

[52] U.S. Cl. ........235/150.27, 235/150.25, 343/117
[51] Int. Cl. ...........................G06f 15/50, G01s 7/46
[58] Field of Search.........235/150.27, 150.2, 150.25, 235/150.26; 343/7.4, 112, 117, 5 DP

[56] References Cited

UNITED STATES PATENTS

| 3,194,949 | 7/1965 | Jasperson | 235/150.27 |
| 3,277,468 | 10/1966 | Caspers | 343/7.4 |
| 3,304,551 | 2/1967 | Kikuo et al. | 343/117 |
| 3,305,868 | 2/1967 | Kikuo et al. | 343/117 |
| 3,316,552 | 4/1967 | Reid | 343/117 |
| 3,353,183 | 11/1967 | Giger | 343/7.4 X |
| 3,403,396 | 5/1968 | Van Popta et al. | 343/5 DP |
| 3,571,479 | 3/1971 | Horattas et al. | 343/5 DP |
| 3,579,237 | 5/1971 | Steingart et al. | 343/5 DP |

FOREIGN PATENTS OR APPLICATIONS

| 1,062,553 | 3/1967 | Great Britain | 343/7.4 |

*Primary Examiner*—Felix D. Gruber
*Attorney*—Richard W. Anderson and Robert J. Crawford

[57] ABSTRACT

A tracking system approach which, unlike that of systems employing closed loop tracking techniques, points the boresight axis of an antenna at a computed future position of a radiating energy source. The source is allowed to drift through the conical scanning beam, during which time-energy detection measurements are made on a periodic basis. A computer receives the energy measurements and computes therefrom the equation of the best straight line corresponding to the error versus time relationship, whereupon the slope and intercept of this fitted line are utilized to compute pointing error. The system is then periodically updated on the basis of this pointing error.

7 Claims, 7 Drawing Figures

INVENTORS.
WALTER R. ILIFF
JOHN M. HOLT
GEORGE E. CHADIMA
ROBERT G. BROWN

BY R. W. Anderson
AGENT

INVENTORS.
WALTER R. ILIFF
JOHN M. HOLT
GEORGE E. CHADIMA
ROBERT G. BROWN
BY R.W. Anderson
AGENT

ENERGY SOURCE TRACKING SYSTEM EMPLOYING DRIFT-LINE TECHNIQUE

This invention relates generally to the tracking of energy radiating bodies and more particularly to an improved passive tracking system for employment with a receiving system of the type providing orthogonal pointing error signals. Application to tracking radiometric sextants will be emphasized for purposes of exemplification and not by way of limitation.

Known automatic passive tracking systems (radiometric sextants) are similar to radar tracking systems in that an antenna pattern is nutated about a boresight axis that extends from the antenna to the target or radiating source. Radiometric sextants include receiving circuits for detecting energy that is radiated from a distant object and include phase detecting circuits that are synchronized with the nutation of the antenna about the boresight axis. These types of devices detect radiated energy in certain microwave bands from celestial bodies such as the sun, the moon, or particular stars, and the relative intensity of the detected output of these certain microwave frequencies determines the direction the antenna is to be positioned to point at the body that is being tracked. The radiometric sextant employs a nutating antenna tracking system which is similar in many respects to tracking radars in that a phase detection process is operated from the energy level obtained from the conically scanned antenna beam which develops bearing and elevation pointing error signals to be employed in directing the boresight axis of the nutating antenna directly at the radiating body.

The present invention, while being described with respect to an improved tracking system for a radiometric antenna, might equally be employed in a satellite tracking system or other type of tracking system the purpose of which is to track an energy radiating body for which the precise orbital path is either known or desired. Thus the source of energy radiation might be any one of the planets the orbital paths of which are defined in detail by ephemeris data, or might be a man-made satellite the precise orbital path of which is either known or desired in terms of time and position.

Generally the system of the present invention is applicable to tracking a radiating body from which level of energy radiation is to be measured and which body follows an orbital path with respect to the earth.

Referring again to a radiometric sextant of the type utilized to track a radiating celestial body by utilizing the electromagnetic energy radiated by that body, a microwave radiometer function is employed to detect the thermal radiation received by a directional antenna and thus produce an electrical output signal proportional to the received microwave energy. The precise direction of arrival of this energy is determined by conically scanning the antenna beam about a boresight axis extending in the general direction of the energy source. The phase and amplitude of the resulting output signal, as compared to a reference scanning rate signal, is interpretable as an angular vector between the conical scan axis and the true direction.

Known radiometric sextant tracking systems employ a closed loop tracking technique wherein the phase and amplitude of output signals are employed continuously to correct the direction of the scan axis to make it coincide as accurately as possible with the direction of energy arrival. Thus the closed loop sextant tracks the source through a servo mechanism which seeks to minimize the amplitude modulation (seek the null) of the output signal from the sextant.

Systems of the closed loop type as concerns tracking are subject to variable tracking error due to variations in internal gain, variations in atmospheric transmittance and changes in thermal radiation intensities from celestial bodies. Further, solar intensities have rapid variations during active periods, daily variations due to the slowly varying component of activity, and a very slow variation corresponding to an 11 year cycle of activity. Similarly lunar intensity varies with both its phase of illumination and its distance from the earth (which changes its angular diameter).

The present invention has as a primary object thereof the development and incorporation into a tracking system of a drift-line tracking technique devised to eliminate the problem of total system gain variations by providing a continuous measurement of system gain. Thus the tracking system of the present invention is self-calibrating in the sense that angular pointing error determinations are essentially independent of system gain variations, fluctuations in the power level of the source, and transmittance of intervening media.

The present invention is featured in the provision of a synchronous detection process which is referenced to antenna beam position in its conical scan, wherein the radiometric sextant output modulation signal is split into quadrature components which correspond to elevation error signals and orthogonal line of sight bearing error signals respectively. The basic principle of the present invention, as defined by the drift-line tracking technique, is that, with a stationary scan axis and sufficiently small pointing error, the error signal level in either the elevation or line of sight bearing channel is approximately a linear function of pointing error and, therefore, a linear function of time due to the apparent angular velocity of the source imparted by earth rotation. Therefore, the ratio of the measured modulation rate of change to the predicted source angular velocity is a direct measure of total system gain in terms of modulation per unit of angular pointing error.

The tracking technique of the present invention is featured, and distinctly unlike that of systems employing closed loop tracking techniques, in the employment of a system wherein the boresight axis of the antenna is pointed at a computed future position of the radiating energy source, and the source is allowed to drift through the conical scanning beam, during which time energy detection measurements are made on a periodic basis. A digital computer receives the energy measurements and determines the slope and intercept of a straight line fit to the time-energy measurements. The slope and intercept of this fitted line are utilized to compute pointing error. The system is then periodically updated on the basis of this pointing error.

The drift-line technique to be described herein, effectively solves the problem of potentially inaccurate conversion of output error signal to absolute angular pointing error by eliminating the effects of unknown or ill-defined system gain change. During each drift period, system gain is measured thus providing a determination of pointing error which is independent of gain changes.

These and other objects and features of the present invention will become apparent upon reading the following description with reference to the accompanying drawings in which.

Figure 3:
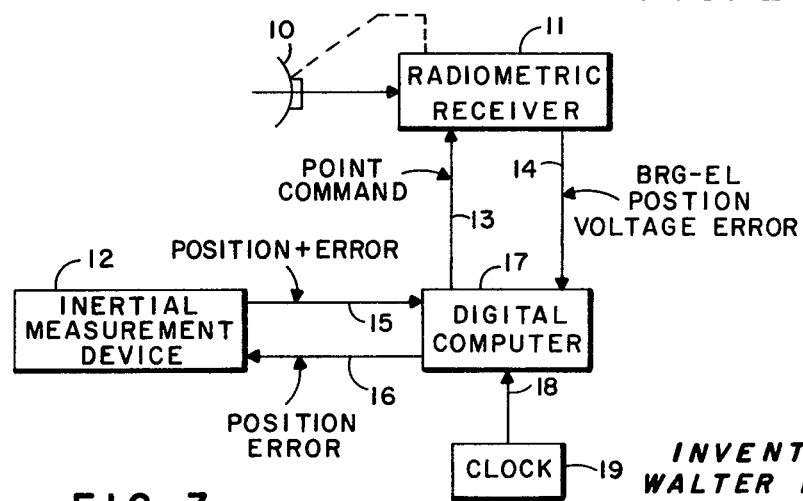
FIG. 3 is a functional diagram of a drift technique pointing or tracking system useful for navigation in accordance with the present invention.

The tracking technique of the present invention, as depicted in FIG. 3, employs a radiometric sextant for detecting radiating energy from a celestial body or other radiating body of known orbital position, a digital computer, an inertial measurement unit, and a timing or clock source.

The system of FIG. 3 is utilized to update the inertial measurement device based on calculated information obtained from the known position of a radiating celestial body. Inertial measurement devices may accurately predict changes in longitude and latitude from an initial position by means of various integration processes performed on accelerometers, however, such units, depending upon their complexity, are subject to drift errors and must be periodically updated or calibrated. The present invention then, as employed in the FIG. 3 system, might be basically defined as a system providing an update on a periodic basis for an inertial guidance system. This update is performed on the basis of celestial observations by means of the radiometric sextant or, as previously mentioned, might be performed on the basis of receiving energy from any body from which energy is caused to be radiated, which body is known to follow a precise orbital path which can be defined by ephemeris data.

Figure 7:
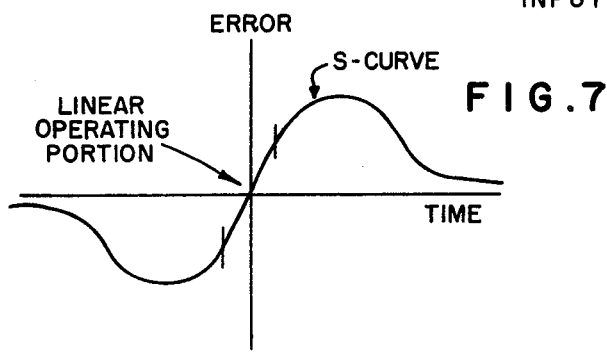
FIG. 7 represents a typical S curve of received energy versus time for a radiation body passing through the aperture of a fixed tracking antenna.

The drift-line technique might generally be defined as pointing the boresight of a nutating antenna at the predicated position that a radiating body will occupy a discrete time in the future. As the radiating body passes through the aperture of the fixed antenna, the received energy level should pass through the zero or crossover portion of the S curve of the received energy at time zero if the predicted future position is accurate. FIG. 7 depicts a typical S-curve of energy versus time obtained by a stationary antenna with the radiating body passing through the antenna aperture. If the predicted point at which the body is expected to be in the future is inaccurate, the S curve will be displaced with respect to the zero axis, that is to say, at time zero the received energy will not be passing through the zero axis of the S curve of received energy. Means may then be employed to define the linear portion of the S curve in terms of the known definitions of a straight line, that is, the slope and axis intercept. As will be further described, data may be taken from which a digital computer can determine the slope and intercept of a straight line fit to a number of data acquisition points over a prescribed interval of measurement. From the slope and intercept of the line fit to the received data and the function of the ephemeris data determined straight line for the radiating object, the computer may compute the pointing error of the boresight axis of the antenna in both elevation and bearing, and the system may utilize these pointing errors to correct the inertial measurement device.

In basic operation, the system depicted functionally in FIG. 3 may be defined as follows:

1. The inertial measurement unit furnishes an assumed position of the tracking antenna to the digital computer—this assumed position being equal to the true position plus any error which exists at the moment in the inertial measurement unit.
2. The digital computer utilizes the assumed position input and time from the clock source to generate azimuth and elevation pointing commands for application to the radiometric sextant antenna. The commanded position for the radiometric sextant antenna boresight axis is for a future position of the radiating body, that is, for the position through which the radiating source is expected to pass at intercept time a prescribed time interval from the present, for example 1 minute.
3. The radiometric sextant antenna boresight axis remains stationary for a predetermined time interval (for example, two minutes) during which period the output is defined as error voltages in two coordinates versus time, the two coordinates being line-of-sight bearing and elevation.
4. The digital computer calculates the slope and intercept of a straight line fit to some length of data acquisition at a predetermined sample rate from the radiometric receiver, utilizing, for example, the least squares method. The slope of the fitted line and the angular velocity of the radiating body yield the angular equivalent of error voltage. The fitted line intercept yields angular pointing error from $\Delta V/\Delta t$ (the sextant output) and from the constant relationship of $\Delta \theta/\Delta t$ (ephemeris) the computer derives $\Delta \theta/\Delta V$ as the intercept conversion.
5. The computer translates the pointing error into error in the assumed position which the inertial measurement unit initially furnished, and
6. The inertial measurement unit assumed position (which included the true position plus error) is gradually updated or corrected by the computer output.
7. A repeat cycle is initiated at which time the antenna boresight axis is again positioned at a point through which the radiating body is assumed to pass in one minute and the antenna again remains stationary while the radiating body passes through the antenna aperture, yielding further data acquisition in bearing and elevation from the radiometric sextant output channels.

Figure 1:
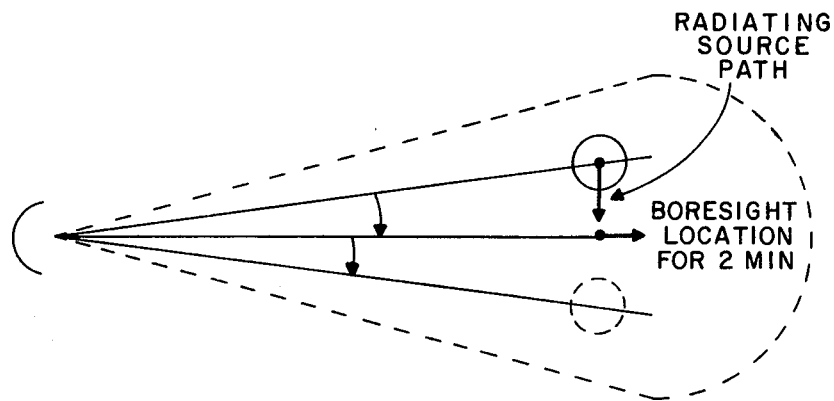
FIG. 1 is a diagrammatic representation of the drift technique antenna pointing geometry.

The drift technique antenna boresight pointing geometry is depicted in FIG. 1 which illustrates the boresight location which is held for two minutes. The sun or moon or other radiating celestial body is initially one minute "behind" the boresight location and, at the conclusion of the computation cycle, is one minute "ahead" of the boresight location.

Figure 2:
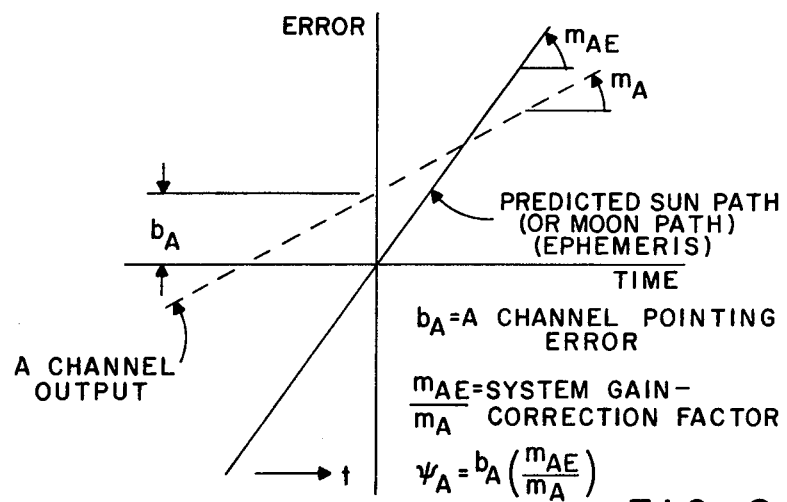
FIG. 2 is a typical representation of drift technique data as concerns pointing data versus time.

The drift technique data principle is illustrated graphically in FIG. 2 which shows a plot of error versus time—the intersection of the error and the time axes being the intercept at time "zero." The predicted radiating body path is depicted as a solid line having a zero axis intercept and slope defined as $m_{AE}$. The dashed line depicts the line fitted by the digital computer based on the received energy level samplings for the time preceding and following the zero axis intercept time. The dashed line is indicated as having a channel pointing error $b_a$ and a slope $m_A$, it being understood that FIG. 2 depicts the situation for but one of the two axes—for example, the elevation axis and depicts data acquisition within the linear portion of the receiver S curve (FIG. 7). The system gain correction factor is constantly obtainable by computing the ratio of the slopes of the predicted path and the actual path as calculated by the computer, such that the corrected pointing error for the channel may be defined as the channel pointing error multiplied by the ratio of the slopes of the two lines. Again it is to be understood that the process and technique would be repeated for the orthogonal (line-of-sight) bearing channel, and the detection technique employed in the radiometric receiver provides means for developing first and second outputs respectively indicative of bearing and elevation erros.

By way of emphasis and summary the drift-line technique outlined herein is basically implemented as follows:

1. The radiometric sextant antenna is commanded to point in the direction of the source computed for some predetermined length of time after initiation of the command, based upon assumed sextant position and the radiating energy source ephemeris data.
2. For a predetermined drift period the source moves linearly through the region conically scanned by the antenna pattern about a stationary scan axis.
3. During the drift period, the elevation and line-of-sight bearing channel outputs are sampled at a predetermined periodic rate, digitalized, and fed to a digital computer by the radiometric sextant.
4. The computer determines the slope and intercept of a straight line fit to the sampled outputs during the drift period.
5. The slope and intercept of the fitted line are used to compute the pointing error which is further translated into error in assumed position for subsequent updating of the inertial measurement unit from which the initial assumed position was taken in step 1.

Figure 4:
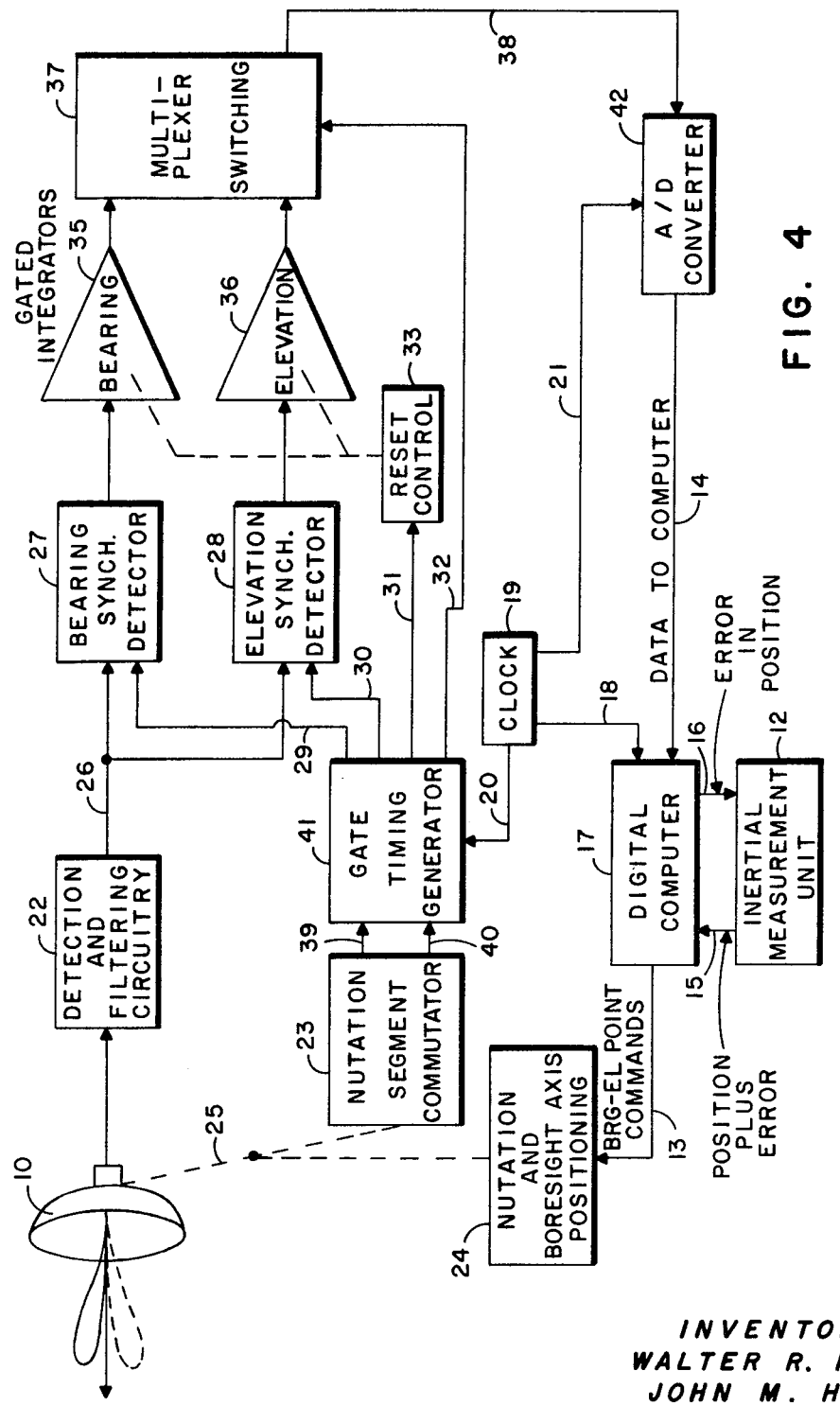
FIG. 4 is a more detailed functional diagram of a particular implementation of the basic system illustrated in FIG. 3.

FIG. 4 illustrates a functional embodiment of a drift-line system in accordance with the present invention by means of which the detected energy levels corresponding to the bearing and elevation components of the received energy are multiplexed in a time-sharing arrangement and applied (after analog to digital conversion) to the digital computer as data input.

Received energy from the antenna member 10 is supplied to a detection and filtering system 22 which might comprise the "front-end" of a radiometric receiver. The detection circuitry 22 provides an output 26 in the form of a voltage level corresponding to the received energy. It is to be understood that this voltage level is a continuously varying function when the antenna boresight axis is not aligned directly on the energy radiating body. Through a mechanical linkage 25 with the antenna 10, a nutation commutator 23 is driven to provide outputs 39 and 40 which correspond respectively to azimuth and elevation phase-position references as concerns the alignment of the boresight axis with the radiating body. Reference is made to U.S. Pat. No. 2,969,540 to Clyde Stewart, assigned to the assignee of the present invention, for a description of antenna nutation commutation arrangements which are employed in tracking antenna devices such as a radiometric receiver.

In the embodiment of FIG. 4, the outputs from the nutation commutator 23 are applied to a gate timing generator circuitry 41 which, under the control of the input 20 from master clock 19, generates appropriate timing and gating outputs. Gate outputs 29 and 30 are utilized as control inputs to synchronous detectors 27 and 28 such that the bearing synchronous detector 27 provides an analog output corresponding to energy level variations in a first axis while the altitude synchronous detector 28 provides an output in analog form corresponding to the energy variation in a second axis. The output from the receiver detection and filtering circuitry 22 is applied as inputs to each of the synchronous bearing detectors. In operation, the synchronous bearing detectors separate those portions of the output 26 from the detector 22 into line separated voltage levels corresponding respectively to bearing and altitude components of energy level measurement. The outputs from the synchronous detectors are applied to a pair of gated integrators 35 and 36 which store signals corresponding to the energy levels over a calculation period and apply the signals to a multiplexed switching arrangement 37. The gated integrators 35, 36 are controlled by reset control circuitry 33 under the influence of reset timing pulses 31 from the gate timing generator 41 which are in turn timed by the nutation cycle time. The multiplexed switching arrangement 37 is controlled by a sampling output 32 from the gate timing generator 41 such that the output 38 from the multiplexed switching circuitry 37 corresponds to sequential or multiplexed error signals corresponding to bearing and altitude. These signals, analog in nature, are applied to an analog-to-digital converter 42 which under the control of clock signals 21, develops appropriate digital data corresponding respectively to altitude and azimuth error signals in the form of bits per unit of time as an e input 14 to digital computer The sampling effected by the multiplexer switch arrangement 37 is at a predetermined rate, for example, every one-tenth second. This sampling is continuously effected during the two minute period of time during which the boresight axis of the antenna is fixed and the radiating body passes through the aperture of the antenna. At the conclusion of a nutation cycle the reset 31 from the gate timing generator 41 sets the gated integrators 35 and 36 to zero to ready them for an ensuing calculation period.

Digital computer 17 utilizes the data input 14 from the analog-to-digital converter to calculate the intercept and slope of a straight line fit to the data in each of two axes and, as previously discussed, develops bearing and elevation pointing signals 13 as command signals for application to the antenna nutation and bore axis positioning mechanism 24. Digital computer 17 applies the previously discussed error in position updating signal 15 to the inertial measurement unit 12, while the inertial measurement unit 12 provides a "position plus error" input 16 to the digital computer.

The present invention in the above-described embodiment thus provides a tracking technique employing direct measurements of atmospheric and radiometric variations for use in correcting pointing error data, and places the responsibility of pointing accuracy more directly upon the ephemeris data used to point the sextant to the radiating source.

The above described embodiment utilizes the drift-line technique of the present invention as an improved tracking means in conjunction with an inertial navigation system for the purpose of updating the inertial navigation system. The source being tracked is defined by known ephemeris data used as reference.

The technique of the present invention is additionally applicable to optical star tracking systems or radio tracking systems for radiation sources where radiation source location parameters are to be determined.

Figure 5:
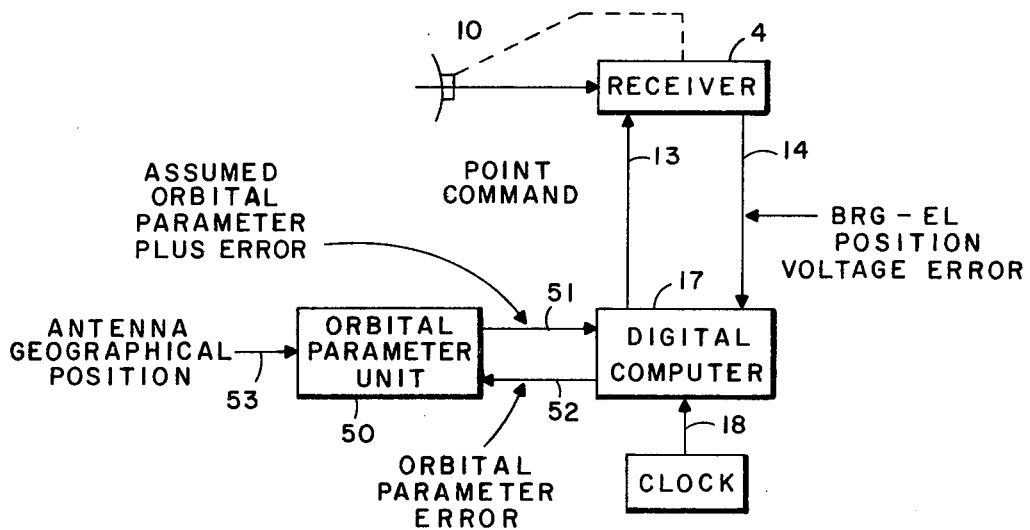
FIG. 5 is a function diagram of a drift technique tracking system for determination of source position and orbital path.

The drift-line technique, as applied to determination of orbital parameters of an energy radiating source, is depicted functionally in FIG. 5 wherein the orthogonal bearing and elevation position voltage errors from the receiver 11 are again applied to the digital computer 17. As in the previously described embodiment, the computer provides pointing commands 13 to the antenna system associated with the receiver and, generally speaking, the computer is programmed similarly to the previous embodiment with the exception that the antenna of the receiving system is considered to be located at a reference position defined by known geographical position parameters. The basic system of tracking as depicted in FIG. 5 includes an orbital parameter readout unit 50 which provides an input on line 51 to the digital computer in the form of assumed orbital parameters of a source being tracked plus some error. The computer is programmed to receive this information, in conjunction with the bearing-elevation position voltage errors from the receiver, and to develop an output 52 applied back to the orbital parameter unit which corresponds to orbital parameter error per se for updating purposes. Thus, rather than utilizing the drift-line technique to update a navigation system, the embodiment of FIG. 5 utilizes the drift-line technique to update the orbital parameters of a radiating source for which orbit determination is desired.

In basic operation then the tracking embodiment depicted functionally in FIG. 5 is defined as follows:

1. The position of the observer (that is the receiver known geographical position) is furnished from independent navigation sources and this known position is furnished to the digital computer as a reference input parameter.
2. The digital computer utilizes assumed orbital parameters of the source being tracked and time from the clock source to generate bearing and elevation pointing commands for application to the receiving system antenna. The commanded position for the antenna boresight axis is for a future position of the radiating body, that is, for the position through which the radiating source is expected to pass at intercept time at a prescribed time interval from the present.
3. The receiving system antenna boresight axis remains stationary for approximately twice the prescribed time interval above during which period the output is defined as error voltages in two coordinates versus time, the two coordinates being line-of-sight bearing and elevation.
4. The digital computer determines the slope and intercept of a straight line fit to some length of data acquisition at a predetermined sample rate from the receiving system. The slope of the line and the angular velocity of the radiating body yields the angular equivalent of error voltage.
5. The computer translates the pointing error into error in the assumed orbital parameters of the radiating source being tracked, and
6. The orbital parameters originally inserted (which included the assumed orbital parameters plus error) are updated or corrected by the computer output.
7. A repeat cycle is initiated during which the antenna boresight axis is again positioned at a point through which the body being tracked is assumed to pass in the predetermined period of time and a further data acquisition is obtained in bearing and elevation from the receiver output channels.

Figure 6:
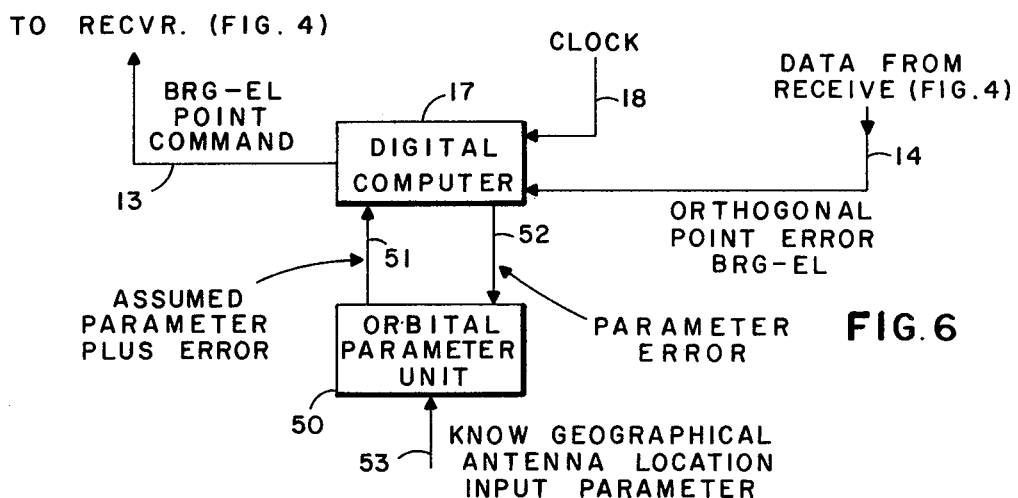
FIG. 6 is a functional modification of the FIG. 4 system implementation for use in source location.

FIG. 6 represents a functional modification of the inertial measurement unit updating embodiment of FIG. 4 for operation as a system for determination of radiating source orbital parameters. With reference to FIG. 6, the data from the receiver of FIG. 4, in the form of orthogonal pointing errors in bearing and elevation, is applied on line 14 to the digital computer 17 as in the previous embodiment. The digital computer receives an assumed orbital parameter (plus error) input from the orbital parameter unit 50 on line 51 and, through the above outlined program, develops source orbital parameter error output on line 52 as an updating input to the orbital parameter unit 50.

Although the present invention has been described with respect to particular embodiments thereof, it is not to be so limited as changes might be made therein which fall within the scope of the invention as defined in the appended claims.

We claim:

1. A navigation system comprising a receiver of energy from an energy radiating source having known orbital parameters, a computer means, an inertial measurement means, said receiver including radiation sensing means and means for nutating said sensing means about a steerable boresight axis, said receiver developing first and second output voltages respectively indicative of instantaneous bearing and elevation axis pointing errors between the boresight axis of said sensing means and said energy radiating source, said inertial measurement means developing output signals defining the earth geographical position of said radiating sensing means, means for feeding said inertial measurement unit output signals as a first input parameter to said computer, said computer receiving ephemeris data defining the time-position of said energy radiating source as a second input parameter thereto, said computer being programmed to calculate from said first and second input parameters, bearing and elevation pointing commands for application to said radiation sensing means based on a computed future position of said source of energy radiation a predetermined time interval from the instant of said calculation, said computer being programmed to effect an ensuing calculation period during which zero pointing command is applied to said radiation sensing means and during which time said energy radiating source passes through the aperture of said radiation sensing means, said calculation period corresponding in time to approximately twice that of said predetermined time interval, said receiver including means for developing said first and second output voltages during the fixed position time of said radiation sensing means, analogue to digital conversion means for providing said first and second output voltages in terms of bits versus time to said computer, said computer computing from said bits versus time input the slope and time axis intercept of a straight line fit to the input data, said computer being programmed to compute from said computed line slope and time axis intercept the ratio of the rate of change of angle of said source of radiated energy with respect to the known rate of change of angular velocity of said energy radiating source, said computer being programmed to further translate calculated pointing error signals into error in said computer first input parameter, and said inertial measurement unit receiving said computer first input parameter error and including means to update said computer first input parameter in accordance with said error.

2. A navigation system as defined in claim 1 comprising means for sampling said receiver output voltages at a predetermined rate during each said calculation period, means for resetting said receiver output voltages to zero at the conclusion of each said calculation period and timing means effecting successive ones of said calculation periods on a predetermined cyclic basis.

3. In a tracking system of the type designed to track an energy radiating source with known orbital parameters, means for pointing the boresight axis of a steerable radiation sensing means at a computed future position of said energy radiating source, said radiation sensing means developing orthogonal output voltages, means integrating the orthogonal output of said radiation sensing means, means for sampling the levels of said means for integrating at a predetermined bit rate for an ensuing time period during which said energy radiating source passes through the aperture of the fixed radiation sensing means, means responsive to the output of said means for sampling for computing the respective orthogonal pointing errors of the boresight axis of said radiation sensing means, said means for computing calculating the slopes and intercepts of straight lines fit to the output of said sampling means, which intercepts are proportional to respective orthogonal pointing errors.

4. In a tracking system of the type employing a positionable radiation sensing means, means for nutating said radiation sensing means about a sensing means boresight axis, and positioning means for steering said radiation sensing means to point said boresight axis at a radiation source; a method of positioning said sensing means boresight axis comprising the steps of; pointing the boresight axis at a predicted future location of said radiating source, maintaining said sensing means at said predicted future location for a predetermined time interval as said radiating source moves linearly through the region conically scanned by said sensing means about said boresight axis, sampling during said predetermined time interval elevation and line-of-sight bearing channel energy level outputs of said sensing means at a predetermined sampling rate, deriving from said sampled outputs the slope and time axis intercept of a straight line fitted to said data using the method of least squares, determining the boresight axis pointing error from said slope and time axis intercept of said fitted line and the slope of the predicted line defined by radiating source ephemeris data, calculating from said pointing error, a subsequently assumed antenna geographical position, and said radiation source ephemeris a command signal, pointing the sensing means boresight axis in response to said command signal in the direction of a subsequent future radiation source position, and repeating the above defined steps at a predetermined cyclic rate.

5. A navigation system for a moving vehicle comprising a receiver of energy from an energy radiating source for which orbital parameters are to be determined, a computer means, said receiver including radiation sensing means and means for nutating said sensing means about a steerable boresight axis, said receiver developing first and second output voltages respectively indicative of instantaneous bearing and elevation axis pointing errors between the boresight axis of said sensing means and said energy radiating source, means for feeding system geographical position signals and assumed radiation source orbital parameters as inputs to said computer, said computer being programmed to calculate from said assumed radiation source ephemeris data and said system geographical position signals bearing and elevation pointing commands for application to said receiving means based on a computed future position of said energy radiating source a predetermined time interval from the instant of said calculation, said computer being programmed to effect an ensuing calculation period during which zero pointing command is applied to said receiving means and during which time said energy radiating source passes through the aperture of said radiation sensing means, said calculation period corresponding in time to approximately twice that of said predetermined time interval, said receiver including means for developing said first and second output voltages during the fixed position time of said radiation sensing means and for providing said first and second output voltages in terms of bits versus time to said computer, said computer computing from said bits versus time input the line slope and time axis intercept of a straight line fit to the bits versus time input, said computer being programmed to compute from said computed slope and time axis intercept parameters the ratio of the rate of change of angle of said source of radiated energy with respect to the assumed rate of change of angular velocity of said energy radiating source, said computer being programmed to further translate calculated pointing error signals into error in the assumed radiation source orbital parameters initially provided said computer, and means to update the assumed radiation source orbital parameters as applied to said computer in accordance with the error in the assumed values thereof supplied from said computer.

6. A navigation system as defined in claim 5 comprising means for sampling said receiver output voltages at a predetermined bit rate during each said calculation period, means for resetting said receiver output voltages to zero at the conclusion of each said calculation period, and timing means effecting successive ones of said calculation periods on a predetermined cyclic basis.

7. In a tracking system of the type employing a positionable radiation sensing means, means for nutating said radiation sensing means about a sensing means boresight axis, and positioning means for steering said radiation sensing means to point said boresight axis at a radiating source the position of which is to be determined; a method of positioning said sensing means boresight axis comprising the steps of; pointing the boresight axis at a predicted future location of said radiating source, maintaining said sensing means at said predicted future location for a predetermined time interval as said radiating source moves linearly through the region conically scanned by said sensing means about said boresight axis, sampling during said predetermined time interval elevation and line-of-sight bearing channel energy level outputs of said sensing means at a predetermined sampling rate, deriving from said sampled outputs the slope and time axis intercept of a straight line fitted to said data using the method of least squares, determining the boresight axis pointing error from slope and time axis intercept of said fitted line and the slope of the predicted line defined by radiating source assumed orbital parameters, calculating from said pointing error, a subsequently assumed radiating source position, and known sensing means geographical position a command signal; pointing the sensing means boresight axis in response to said command signal in the direction of subsequent future radiating source position, and repeating the above-defined steps at a predetermined cyclic rate.

* * * * *